No. 736,869. PATENTED AUG. 18, 1903.
J. J. McTIGHE, DEC'D.
A. & M. A. McTIGHE, EXECUTRICES.
MANUFACTURE OF LIME AND GAS.
APPLICATION FILED OCT. 5, 1899. RENEWED MAY 23, 1903.
NO MODEL. 2 SHEETS—SHEET 1.
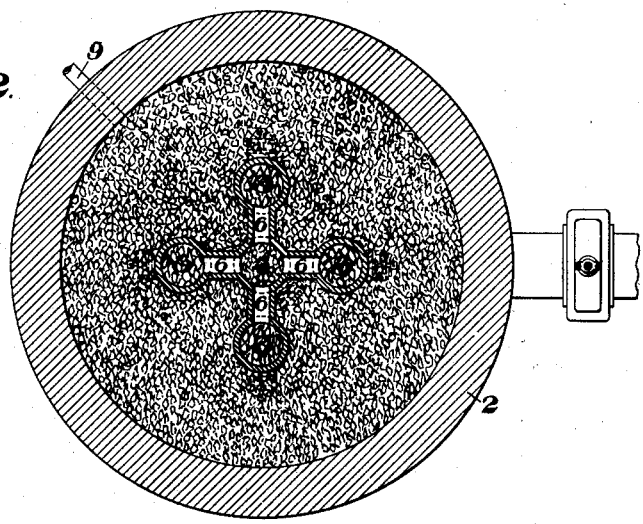
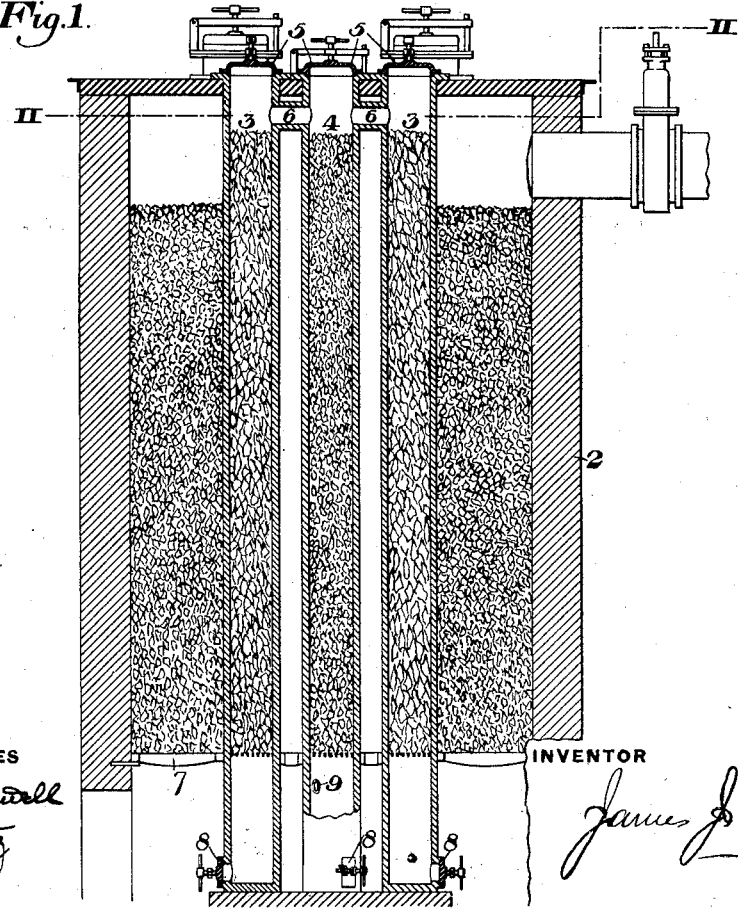

No. 736,869. Patented August 18, 1903.

UNITED STATES PATENT OFFICE.

JAMES J. McTIGHE, OF PITTSBURG, PENNSYLVANIA; ANNA McTIGHE AND MARY ADELAIDE McTIGHE EXECUTRICES OF SAID JAMES J. McTIGHE, DECEASED.

MANUFACTURE OF LIME AND GAS.

SPECIFICATION forming part of Letters Patent No. 736,869, dated August 18, 1903.

Application filed October 5, 1899. Renewed May 23, 1903. Serial No. 158,470. (No specimens.)

*To all whom it may concern:*

Be it known that I, JAMES J. McTIGHE, of Pittsburg, in the county of Allegheny and State of Pennsylvania, have invented a new and useful Improvement in the Manufacture of Lime and Gas, of which the following is a full, clear, and exact description, reference being had to the accompanying drawings, forming part of this specification, in which—

Figure 3:
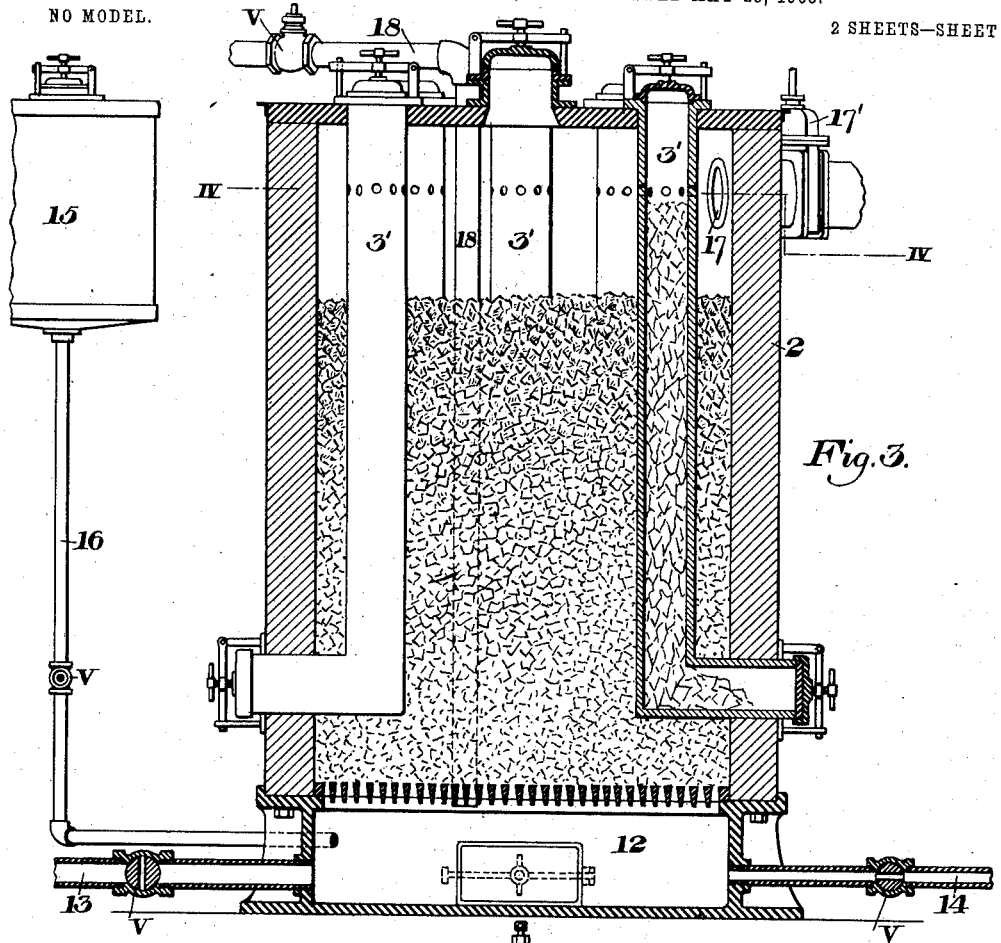
Figure 4:
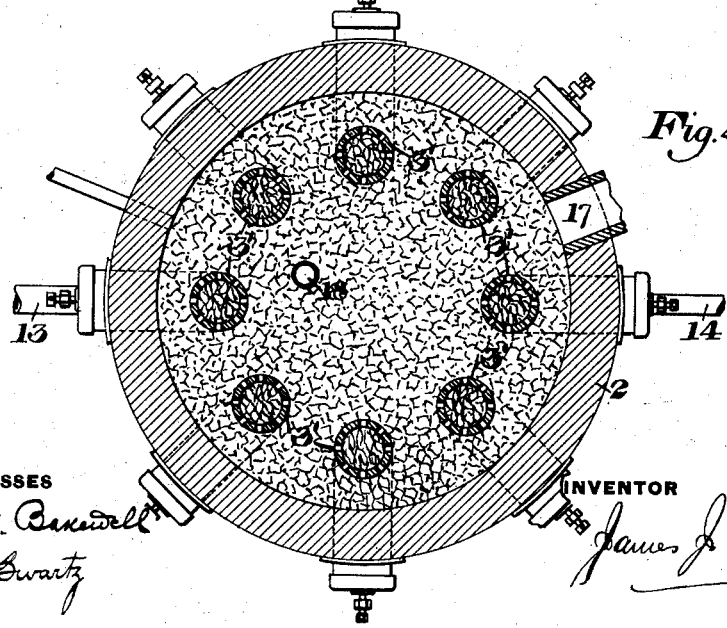

Figure 1 is a vertical section of apparatus embodying my invention. Fig. 2 is a horizontal section on the line II II of Fig. 1. Fig. 3 is a vertical sectional view of a modification, and Fig. 4 is a horizontal section on the line IV IV of Fig. 3.

The object of my invention is to provide a cheap and efficient process for the simultaneous manufacture of lime and CO gas; and it consists, broadly, in conducting the operation under a commercial vacuum, and by the term "commercial vacuum" I mean a decided and material reduction of pressure obtainable by ordinary improved commercial mechanism as distinguished from the partial vacuum and the chemically-produced vacuum of the laboratory.

It consists also in other novel features hereinafter described.

Hitherto in the manufacture of lime (CaO) it has been customary to charge the limestone into the well-known limekiln and by the application of heat thereto disassociate and drive off by the draft of the burning fuel the carbonic-acid gas ($CO_2$) at atmospheric pressure. This process has many disadvantages that are entirely removed by the use of my improved method, among which disadvantages may be enumerated as follows: First, a very high temperature is necessary at atmospheric pressure to disassociate the lime and carbon dioxid, whereas in my method a much lower temperature may be used, approximately about one-half the temperature formerly necessary; second, the high temperature above noted causes the production of what is known as "unburned lime," a useless product, formed by the combining of the silica of the limestone with the calcium, (this cannot form at the low temperature used in the practice of my method,) and, third, the carbonic-acid gas ($CO_2$) or carbon dioxid is a waste product, whereas in my method this gas is preserved and utilized as a by-product. As hereinafter more fully described, I also provide means, when desirable for illuminating purposes, for carbureting this gas.

In Figs. 1 and 2 I show apparatus adapted for the practice of my invention, in which 2 represents a furnace having a number of upright retorts 3 3, adapted to contain limestone, and one or more retorts 4, adapted to contain coke or coal for the conversion into carbon monoxid of the carbon dioxid obtained from the retorts 3. The retorts 3 and 4 are fitted at their upper ends with removable charging-doors 5, adapted to effect an airtight closure, and each of the limestone-retorts 3 is connected by a pipe 6 with the carbon-retort 4, so that the carbon dioxid generated in the limestone-retorts 3 may be drawn into the upper end of the carbon-retort 4 and downwardly through the fuel therein for the purpose of conversion into carbon monoxid. At the base of the furnace is a grate 7 for the combustion of fuel for heating the retorts, and the several retorts extend downwardly below the grate-level and each at its lower end is provided with a door 8 for the removal of its contents, these doors, as well as the charging-doors, being adapted to be sealed tightly in order that a partial vacuum may be maintained within the retorts during the manufacture of the gas. Near the lower end of the carbon-retort 4 is an exhaust-pipe 9, connecting with the chamber of a vacuum group, so that a low pressure is maintained in all the retorts.

The operation is as follows: The retorts 3 are charged with limestone and the retort 4 with carbonaceous material, preferably coke, and heat being applied these retorts and their contents are raised to incandescence, whereupon the exhaust-pump in connection with pipe 9 is set in operation, whereby the internal pressure in the retorts is reduced and the gas generated in retorts 3 is caused to flow through passages 6 downwardly through retort 4 toward outlet-pipe 9. The heating of the limestone ($CaCO_3$) causes its disassociation into $CO_2$ and $CaO$. The carbon-dioxid gas ($CO_2$)

thus produced is incombustible, but when it is drawn through the passages 6 and down through the retort 4 it comes into contact with the hot carbon and combining therewith is converted into carbon monoxid, the reaction expressed in formula being $CO_2$-$O$-$2CO$. The gas (CO) thus produced passes through the exhaust-pipe 9, being cooled and washed, if preferred, on its way to the gasometer, where it assumes atmospheric pressure. Quicklime which is thus made in the retorts 3 is removed from time to time, and the process will thus furnish an abundant quantity of excellent building-lime. The coke in the retort 4 is gradually consumed by the passage of the carbon-dioxid gas therethrough, and the ashes resulting therefrom are removed from time to time through a suitable cleaning-door. If bituminous coal be used instead of coke, the resultant gas will be principally CO, with some hydrogen, ($CH_4$,) &c. The exhausting device which I use is preferably a Bunsen or like air pump, which operates to chill the gas which passes through the exhaust-pipe and by such chilling prevents the gas from returning to the condition of carbon dioxid. It will be observed that the coke-retort is heated by the same fuel that disintegrates the $CaCO_3$.

In Figs. 3 and 4 of the drawings I show my apparatus adapted to the manufacture of combined fuel-gas and illuminating-gas. In this case the retorts 3' 3' contain limestone, but instead of opening into other retorts these limestone-retorts open near the upper end directly into the furnace-chamber above the bed of fuel, as shown in Fig. 3. The ash-pit 12 of the furnace is tightly sealed and has a pipe 13 entering it to supply an air-blast and an exhaust-pipe 14, leading therefrom to the exhaust apparatus. 15 is a vessel containing crude petroleum or other hydrocarbon and having a pipe 16 leading to the ash-pit. 17 is the flue leading from the furnace-chamber for the exit of the products of combustion, this flue being equipped with a valve 17'. 18 is a second exhaust-pipe leading to the exhausting apparatus and extending downwardly through the bed of fuel in the furnace to the ash-pit 12. The pipes 13, 14, 16, and 18 are provided with valves V, as shown. The operation of this form of my improvement is as follows: The fuel in the furnace is brought to a state of incandescence by combustion maintained by an air-blast from the pipe 13, thus heating the limestone-retorts. When the blast has brought the fuel to a state of incandescence, the stack-valve 17' and the valve of the air-blast pipe are closed and the valve of the exhaust-pipe 14 is opened. The consequence is that the carbon-dioxid gas from the retorts by the action of a vacuum-pump in connection with pipe 14 is sucked down through the bed of incandescent fuel, wherein it is converted to carbon-monoxid gas, which is drawn off through said pipe 14, and, as above explained, the partial vacuum maintained in the retorts by the exhausting apparatus greatly facilitates the action and causes the liberation of the carbon-dioxid gas and its conversion into carbon-monoxid gas more rapidly and with a less expenditure of heat units than otherwise. When the operation last described has continued long enough to reduce the temperature of the bed of fuel below the working-point, the valve of the exhaust-pipe 14 may be closed, the stack-valve 17' and the valve of the air-blast pipe opened, so as to cause a blast of air to pass through the fuel and to heat it again to incandescence. When it is desired to carburet the gas produced by this apparatus, so that it may be used as illuminating-gas, I close the valve of the exhaust-pipe 14 and open the valve of the exhaust-pipe 18 and the valve of the oil-pipe 16. The carbon-monoxid gas must then pass off through the pipe 18, but there is mingled with it hydrocarbon gas produced by the vaporizing of the oil thrown from the pipe 16 into the superheated chamber 12, and such hydrocarbon gas passing through the heated pipe 18 is fixed.

Within the scope of my invention as defined in the claims my improvement may be practiced in appliances of other kinds, since—

What I claim is—

1. The method of making lime and gas, consisting in producing a practical or commercial vacuum, calcining a carbonate of lime therein and conducting the gas evolved from the lime into contact with heated carbon, substantially as descibed.

2. The method of making lime and gas consisting in raising solid fuel to a high heat, by internal combustion, subjecting carbonate of lime to the heat of such fuel, and passing the gas evolved by the lime through the same fuel which is used to heat the lime; substantially as described.

3. The method of making lime and gas, consisting in heating solid fuel, subjecting a carbonate of lime while under a commercial or practical vacuum to the heat of said fuel, and passing the gas evolved by the lime through the said solid fuel; substantially as described.

4. The method of making lime, consisting in producing a practical or commercial vacuum and calcining a carbonate of lime therein, substantially as described.

In testimony whereof I have hereunto set my hand.

JAMES J. McTIGHE.

Witnesses:
M. S. MURPHY,
CHAS. C. BITTNER.